United States Patent
Ito et al.

(10) Patent No.: US 8,687,144 B2
(45) Date of Patent: Apr. 1, 2014

(54) LIQUID CRYSTAL DISPLAY INCLUDING A DIFFUSION PLATE WITH A BULGE

(75) Inventors: Yoichi Ito, Kanagawa (JP); Tomohiro Maeyama, Kanagawa (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 13/177,249

(22) Filed: Jul. 6, 2011

(65) Prior Publication Data
US 2012/0008066 A1 Jan. 12, 2012

(30) Foreign Application Priority Data

Jul. 7, 2010 (JP) ................................. 2010-155122

(51) Int. Cl.
*G02F 1/1335* (2006.01)
*G02F 1/1333* (2006.01)

(52) U.S. Cl.
USPC .............................. 349/64; 349/58

(58) Field of Classification Search
USPC ....................... 349/64, 58; 362/612
See application file for complete search history.

(56) References Cited

U.S. PATENT DOCUMENTS

| 7,322,732 | B2 * | 1/2008 | Negley et al. ................ 362/612 |
| 7,419,279 | B2 * | 9/2008 | Han et al. ..................... 362/225 |
| 8,159,633 | B2 * | 4/2012 | Chang ............................ 349/64 |
| 2006/0133108 | A1 | 6/2006 | Choi et al. |
| 2006/0181867 | A1 | 8/2006 | Choi et al. |
| 2008/0231780 | A1 * | 9/2008 | Graf et al. ...................... 349/112 |
| 2008/0291354 | A1 * | 11/2008 | Oh .................................. 349/58 |
| 2009/0073338 | A1 * | 3/2009 | Jeong ............................. 349/58 |
| 2009/0185104 | A1 | 7/2009 | Watanabe |
| 2010/0245715 | A1 * | 9/2010 | Watanabe et al. ............... 349/64 |
| 2010/0321923 | A1 * | 12/2010 | Paek et al. ..................... 362/97.1 |

FOREIGN PATENT DOCUMENTS

| JP | 6-301004 | 10/1994 |
| JP | 2006-179490 | 7/2006 |
| JP | 2007-095484 | 4/2007 |

* cited by examiner

*Primary Examiner* — Michael Caley
*Assistant Examiner* — Kendrick Hsu
(74) *Attorney, Agent, or Firm* — Hamre, Schumann, Mueller & Larson, P.C.

(57) ABSTRACT

Provided is a liquid crystal display device, including: a liquid crystal panel including a display region for displaying an image; a linear illuminator disposed below the display region and extending linearly; and a diffusion plate disposed between the liquid crystal panel and the linear illuminator, in which the diffusion plate includes a thick portion which is formed to be thicker than another portion located below the display region, and the thick portion is formed opposing to the linear illuminator.

12 Claims, 6 Drawing Sheets

LIQUID CRYSTAL DISPLAY INCLUDING A DIFFUSION PLATE WITH A BULGE

CROSS-REFERENCE TO RELATED APPLICATION

The present application claims priority from Japanese application JP 2010-155122 filed on Jul. 7, 2010, the content of which is hereby incorporated by reference into this application.

BACKGROUND OF THE INVENTION

1. Field of the Invention

The present invention relates to a liquid crystal display device.

2. Description of the Related Art

As a backlight of a liquid crystal display device, there are known an edge light system, in which a light source such as a light emitting diode is disposed on an end surface of a light guide plate so that surface light emission is achieved by the light guide plate, and a direct light system, in which the light source is disposed directly below a liquid crystal panel.

Note that, Japanese Patent Application Laid-open Publication No. 2009-169324 discloses a liquid crystal display device having a structure in which a plurality of light emitting components constructed of fluorescence tubes are disposed directly below a liquid crystal cell. Further, Japanese Patent Application Laid-open Publication No. 06-301004 discloses a liquid crystal display device having a structure in which one light emitting source is disposed below a liquid crystal shutter.

SUMMARY OF THE INVENTION

Here, in order to suppress component costs of a liquid crystal display device of a direct light type, for example, it is conceivable to reduce the number of light sources so that the light sources are sparsely disposed below the liquid crystal panel.

However, when the number of the light sources disposed below the liquid crystal panel are reduced, it becomes hard to uniformly illuminate the liquid crystal panel with a backlight.

In view of the above-mentioned problem, it is an object of the present invention to provide a liquid crystal display device having a structure in which the liquid crystal panel is uniformly illuminated with the backlight even in the case where the number of the light sources are reduced, thereby suppressing costs.

(1) In view of the above-mentioned problem, a liquid crystal display device according to the present invention, includes: a liquid crystal panel including a display region for displaying an image; a linear illuminator disposed below the display region and extending linearly; and a diffusion plate disposed between the liquid crystal panel and the linear illuminator, in which: the diffusion plate includes a thick portion which is formed to be thicker than another portion located below the display region; and the thick portion is formed opposing to the linear illuminator.

(2) In the liquid crystal display device as described in item (1), the liquid crystal display device may further include: an optical sheet disposed between the liquid crystal panel and the linear illuminator; a panel side frame having a frame-like shape and disposed closer to the liquid crystal panel compared to the optical sheet and the diffusion plate; and an illuminator side frame having a frame-like shape and disposed closer to the linear illuminator compared to the optical sheet and the diffusion plate, in which: the panel side frame and the illuminator side frame maybe disposed to have a space therebetween; the diffusion plate and the optical sheet may be inserted into the space between the illuminator side frame and the panel side frame and held therein; and at least one of the panel side frame and the illuminator side frame may include a protrusion in a portion which holds the thick portion of the diffusion plate.

(3) In the liquid crystal display device as described in item (2), the optical sheet maybe disposed closer to the liquid crystal panel compared to the diffusion plate, the diffusion plate may include a top surface which is formed to be flat, and the thick portion may be formed to bulge downward.

(4) In the liquid crystal display device as described in item (2), the panel side frame may include the protrusion in a portion which holds the thick portion of the diffusion plate.

(5) In the liquid crystal display device as described in item (1), the thick portion may be formed to gradually bulge toward a position opposing to a center of the linear illuminator.

(6) In the liquid crystal display device as described in item (2), the thick portion may extend along the linear illuminator into the space between the illuminator side frame and the panel side frame.

(7) In the liquid crystal display device as described in item (2), the protrusion may be formed by attaching a resin plate to at least one of the panel side frame and the illuminator side frame.

(8) In the liquid crystal display device as described in item (2), at least one of the panel side frame and the illuminator side frame may include the protrusion in a portion which holds a thickest portion of the thick portion.

(9) In the liquid crystal display device as described in item (1), the liquid crystal display device may further include: an optical sheet disposed between the liquid crystal panel and the linear illuminator; a panel side frame having a frame-like shape and disposed closer to the liquid crystal panel compared to the optical sheet and the diffusion plate; and an illuminator side frame having a frame-like shape and disposed closer to the linear illuminator compared to the optical sheet and the diffusion plate, in which: the panel side frame and the illuminator side frame may be disposed to have a space therebetween; the diffusion plate and the optical sheet may be inserted into the space between the illuminator side frame and the panel side frame and held therein; the diffusion plate may include a bank portion in a position between the panel side frame and the illuminator side frame, the position being on an extension of a portion opposing to the linear illuminator; and the bank portion may have a thickness larger than a thickness of the thick portion.

According to the present invention, it is possible to provide a liquid crystal display device having a structure in which the liquid crystal panel is uniformly illuminated with the backlight, while reducing the number of the light sources and reducing costs.

DETAILED DESCRIPTION OF THE INVENTION

Hereinafter, embodiments of the present invention are described with reference to the accompanying drawings.

[Embodiment 1]

Figure 1:
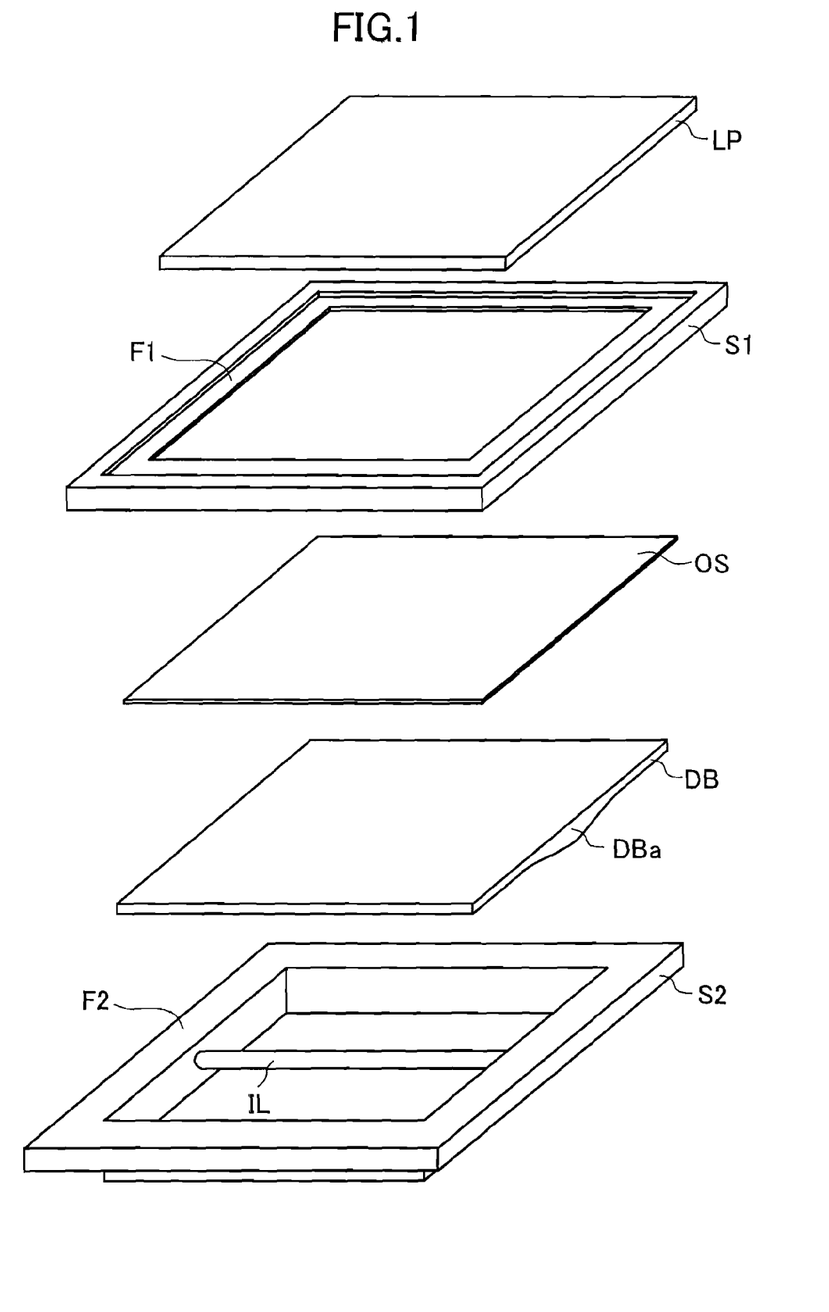
FIG. 1 is an exploded perspective view illustrating main components of a liquid crystal display device according to Embodiment 1.

FIG. 1 is an exploded perspective view illustrating main components of a liquid crystal display device according to Embodiment 1 of the present invention. As illustrated in FIG. 1, the liquid crystal display device according to Embodiment 1 includes a liquid crystal panel LP, a support member S1, an optical sheet OS, a diffusion plate DB, a support member S2, and a linear illuminator IL.

The liquid crystal panel LP is configured to include a TFT substrate, which is a glass substrate on which thin film transistors (TFT) are formed in matrix, a counter substrate opposing to the TFT substrate, and a liquid crystal layer sandwiched between the TFT substrate and the counter substrate. The liquid crystal display panel LP further includes an upper polarizing plate and a lower polarizing plate whose transmission axes are arranged orthogonal to each other.

A light (backlight) illuminating the liquid crystal panel LP is transmitted through the lower polarizing plate to be converted into a linearly polarized light. The linearly polarized light is controlled in its polarization direction for each pixel according to a crystal state of the liquid crystal layer, and transmitted through the upper polarizing plate or shielded according to its polarization state. The liquid crystal panel LP includes a display region for displaying an image. The display region includes a plurality of pixels arranged in matrix thereon, and the crystal state of the liquid crystal layer is controlled for each pixel by the thin film transistors.

The linear illuminator IL is disposed below the display region of the liquid crystal panel LP and functions as a light source of the backlight illuminating the display region. The linear illuminator IL in this embodiment is a cold-cathode fluorescent tube, which is an illuminator linearly emitting light. As illustrated in FIG. 1, the linear illuminator IL is disposed in a position corresponding to the center of the display region of the liquid crystal panel LP so as to be substantially parallel to a longer direction of the liquid crystal panel LP.

The diffusion plate DB is disposed between the linear illuminator IL and the liquid crystal panel LP, and diffuses the light from the linear illuminator IL to illuminate the liquid crystal panel LP with the light. The diffusion plate DB in this embodiment is formed of a resin plate such as an acrylic plate with microscale spheres that have a refractive index different from that of a material of the resin plate and are randomly mixed therein. Thus, as a thickness of the diffusion plate DB becomes larger, a light diffusion degree of the diffusion plate DB becomes larger. In particular, the diffusion plate DB in this embodiment includes a thick portion DBa as illustrated in FIG. 1. The thick portion DBa is located in a position opposing to the linear illuminator IL. The thick portion DBa is described in detail below.

The optical sheet OS in this embodiment is disposed between the diffusion plate DB and the liquid crystal panel LP, and includes a plurality of microlenses on a surface facing the liquid crystal panel LP. The optical sheet OS allows the backlight to illuminate the liquid crystal panel LP while concentrating the light from the diffusion plate DB in a front direction (direction perpendicular to the display region).

The support member S1 is made of a resin and supports the liquid crystal panel LP from below. The support member S1 in this embodiment includes a panel side frame F1 having a frame-like shape, and the panel side frame F1 supports the liquid crystal panel LP from below while fixing an outer periphery of the liquid crystal panel LP by an adhesive member or the like.

The support member S2 is made of a resin and supports the support member S1 from below. The support member S2 in this embodiment includes an illuminator side frame F2 having a frame-like shape and a box-like portion for containing the linear illuminator IL. The diffusion plate DB and the optical sheet OS are held between the panel side frame F1 and the illuminator side frame F2.

Figure 2:
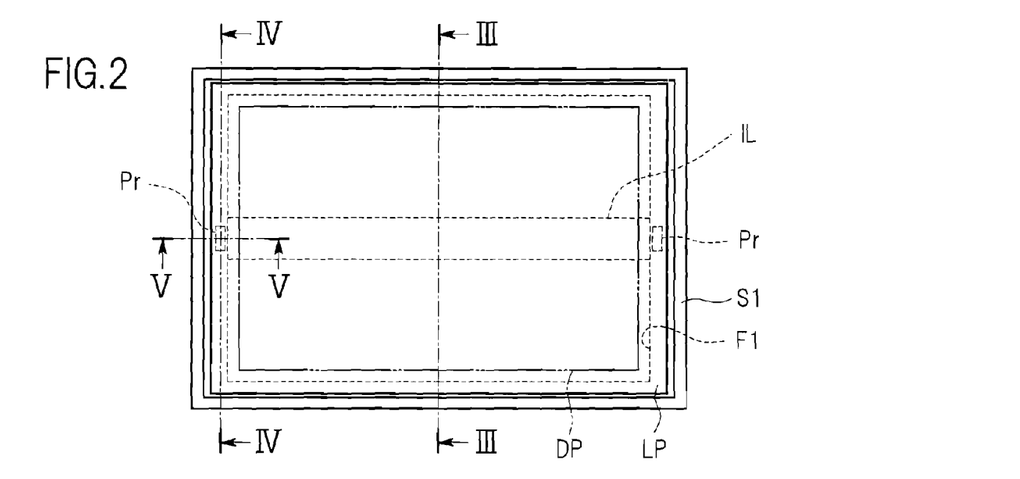
FIG. 2 is a schematic plan view illustrating the liquid crystal display device according to Embodiment 1.

Next, FIG. 2 is a schematic top view illustrating the liquid crystal display device in this embodiment. In the liquid crystal display device in this embodiment, the liquid crystal panel LP is disposed in such a manner that the horizontal direction (the longer direction) is longer than the vertical direction (the shorter direction) as seen by a viewer. As illustrated in FIG. 2, the display region DP of the liquid crystal panel LP is disposed at a position inside the panel side frame F1.

As illustrated in FIG. 2, the linear illuminator IL extends linearly along the longer direction of the liquid crystal panel LP and is disposed in a position corresponding to the center in the shorter direction of the liquid crystal panel LP. The thick portion DBa of the diffusion plate DB (not shown in FIG. 2) is, in this embodiment, formed to have a band-like shape along a direction in which the linear illuminator IL extends, and the thick portion DBa extends in the longer direction of the liquid crystal panel LP and in parallel to the linear illuminator IL.

Figure 3:
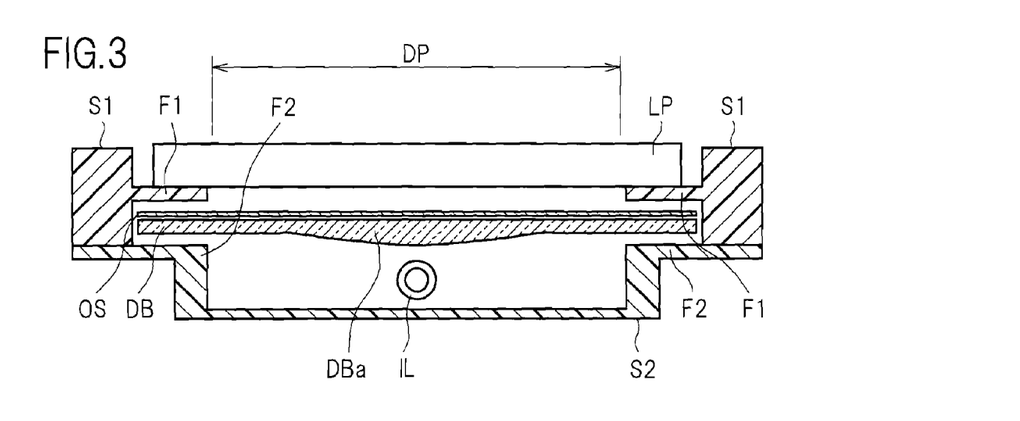
FIG. 3 is a cross-sectional view taken along the line III-III of FIG. 2.

Now, FIG. 3 is a schematic cross-sectional view taken along the line III-III of FIG. 2.

As illustrated in FIG. 3, the diffusion plate DB includes the thick portion DBa which is formed thicker than surroundings. And the thick portion DBa is formed to be thicker than other portions located below the display region DP. In the diffusion plate DB, a position opposing to the linear illuminator IL receives a large amount of incident light. However, the thick portion DBa is disposed opposing to the linear illuminator IL, and hence the light emitted from the linear illuminator IL is efficiently diffused up and down in the shorter direction. This leads to a uniform irradiation of the backlight to the liquid crystal panel LP.

Further, the diffusion plate DB in this embodiment includes a top surface, which is formed to be flat, and a bottom surface, which bulges toward the linear illuminator IL so as to form the thick portion DBa. As illustrated in FIG. 3, the thick portion DBa is formed to be wider than the linear illuminator IL and disposed opposing to the linear illuminator IL. Further, the thick portion DBa in this embodiment is formed to gradually increase in thickness toward the center of the linear illuminator IL and to be largest in thickness in a portion opposing to the center of the linear illuminator IL. The thick portion DBa is formed so as to gradually change in thickness in this way, and hence a sharp change in distribution of the backlight illuminating the liquid crystal panel LP is suppressed.

Now, the panel side frame F1 and the illuminator side frame F2 for holding the diffusion plate DB and the optical sheet OS are described in detail.

The diffusion plate DB and the optical sheet OS are held between the panel side frame F1 and the illuminator side frame F2 while keeping some clearance in order to prevent a change in optical properties caused by a strain due to thermal expansion. In other words, the diffusion plate DB and the optical sheet OS are not completely fixed, allowing dimensional changes due to their thermal expansion coefficients different from each other.

Specifically, the panel side frame F1 and the illuminator side frame F2 are disposed to have a space therebetween, and the diffusion plate DB and the optical sheet OS are inserted into the space and held therein. As illustrated in FIG. 3, the diffusion plate DB and the optical sheet OS are held with some clearance ensured in an in-plane direction and a thickness direction. The panel side frame F1 and the illuminator side frame F2 are disposed to maintain a wider space therebetween than a total thickness of the thick portion DBa and the optical sheet OS.

Figure 7A:
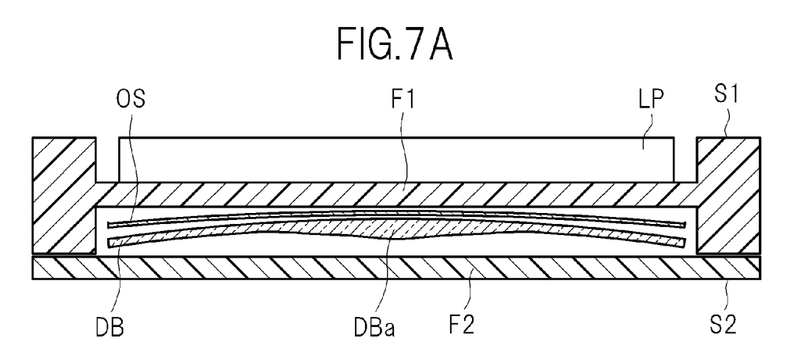
FIG. 7A is a view illustrating how a diffusion plate including a thick portion vibrates in the liquid crystal display device.
Figure 7B:
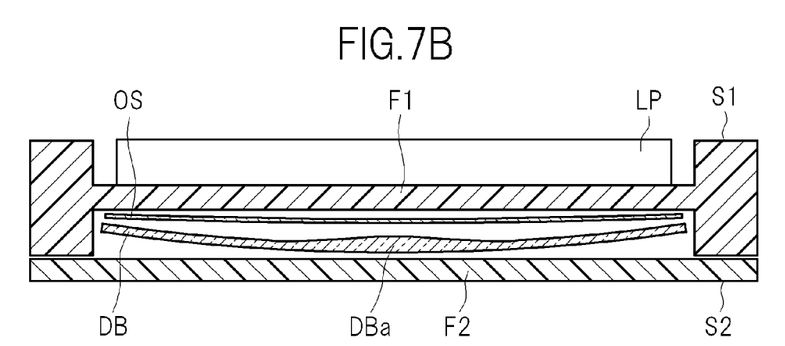
FIG. 7B is a view illustrating how the diffusion plate including the thick portion vibrates in the liquid crystal display device.

However, because the diffusion plate DB is held while keeping the clearance as described above, the thick portion DBa may cause the diffusion plate DB to vibrate. FIGS. 7A and 7B are views illustrating how the diffusion plate DB vibrates. The diffusion plate DB and the optical sheet OS have different natural frequencies from each other. In a case where a vibration of relatively high frequency is applied to the liquid crystal display device, the optical sheet OS may vibrate weakly and the diffusion plate DB including the thick portion DBa may vibrate strongly.

FIGS. 7A and 7B illustrate portions of the diffusion plate DB and the optical sheet OS which are inserted between the panel side frame F1 and the illuminator side frame F2, and specifically, illustrate a cross-section corresponding to a position of the line IV-IV of FIG. 2. As illustrated in FIGS. 7A and 7B, in a case where the diffusion plate DB vibrates strongly, the optical sheet OS is repeatedly brought into contact with the panel side frame F1, with the result that there is a risk in that the optical sheet OS may get damaged and chips from the optical sheet OS may adversely affect an image.

In this embodiment, in view of the above-mentioned risk, a protrusion Pr is disposed in order to suppress the vibration of the diffusion plate DB. The protrusion Pr is disposed in at least one of a portion of the panel side frame F1 which holds the thick portion DBa and a portion of the illuminator side frame F2 which holds the thick portion DBa. This makes the vibration of the thick portion DBa of relatively high frequency weaker, and the damage to the optical sheet OS and the chips from the optical sheet OS are reduced.

Figure 4A:
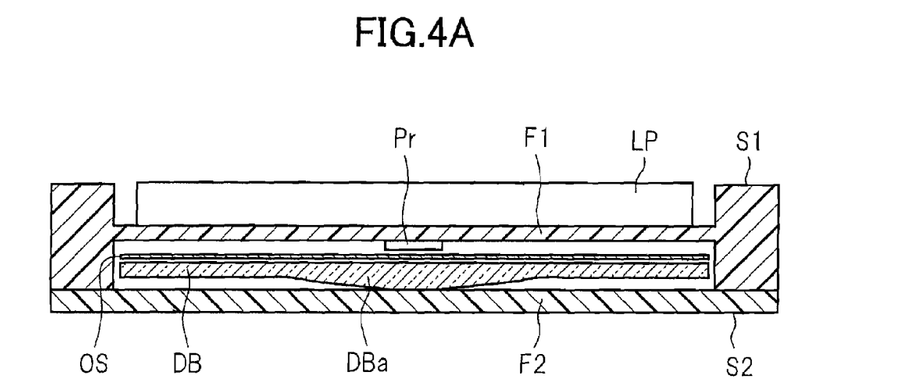
FIG. 4A is a cross-sectional view taken along the line IV-IV of FIG. 2.
Figure 4B:
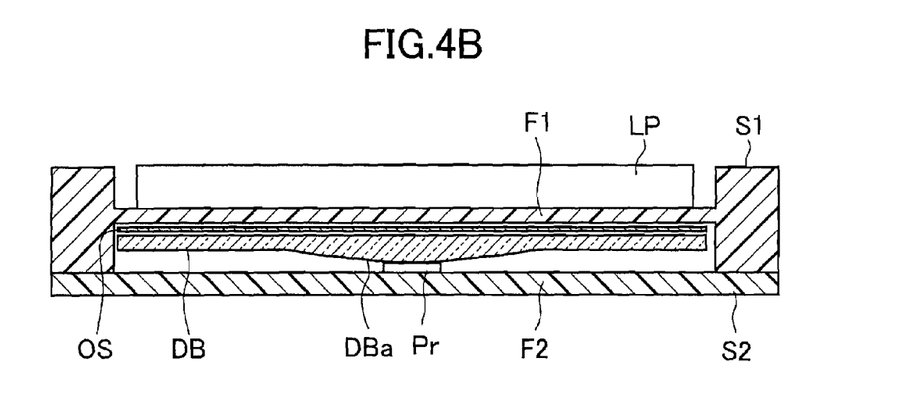
FIG. 4B is a cross-sectional view taken along the line IV-IV of FIG. 2, according to another embodiment.
Figure 5A:
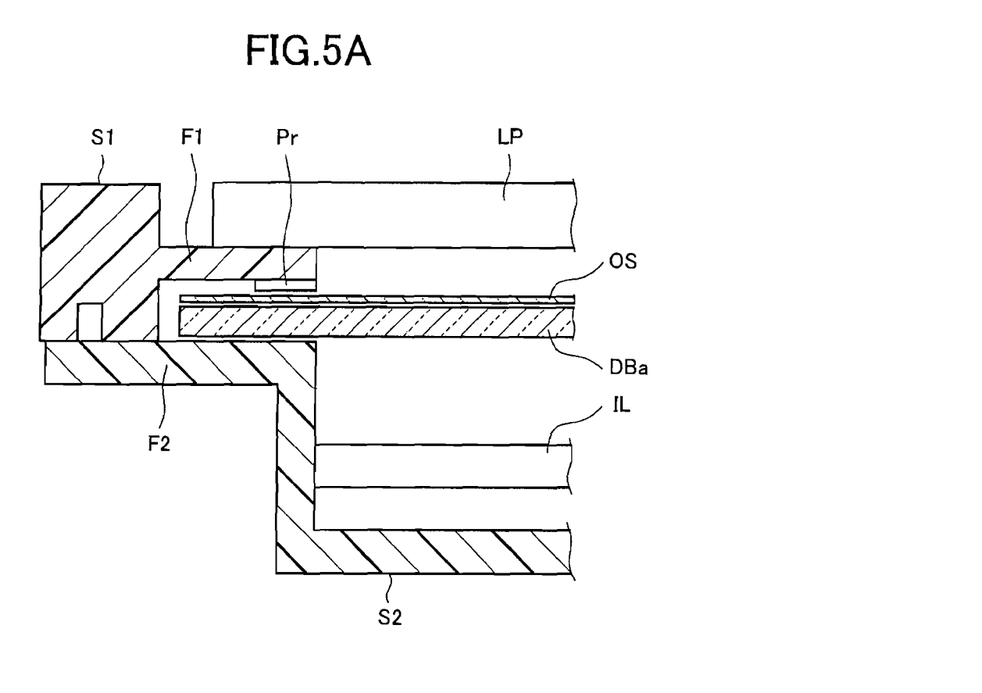
FIG. 5A is a cross-sectional view taken along the line V-V of FIG. 2.
Figure 5B:
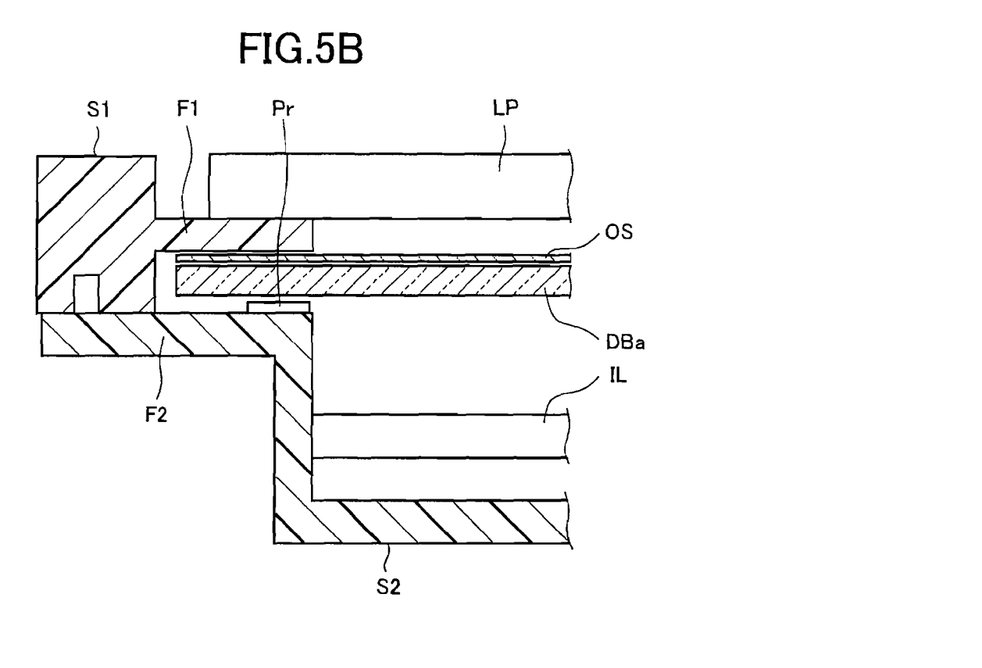
FIG. 5B is a cross-sectional view taken along the line V-V of FIG. 2, according to another embodiment.

FIGS. 4A and 5A are cross-sectional views taken along the line IV-IV and the line V-V of FIG. 2, respectively. Similarly, FIGS. 4B and 5B are cross-sectional views taken along the line IV-IV and the line V-V of FIG. 2, respectively, according to another embodiment. The protrusion Pr in this embodiment is a resin plate made of a polyethylene terephthalate (PET) film (polyester film), and attached by a double-sided tape to a portion of the panel side frame F1 which sandwiches and holds the thick portion DB together with the illuminator side frame F2. As illustrated in FIG. 2, the protrusions Pr are disposed in two positions corresponding to the center in the shorter direction of the liquid crystal panel LP, the positions being on the extension of a portion opposing to the linear illuminator IL. With regard to the position in which the protrusion Pr is disposed, it is desired that the protrusion Pr be disposed in a portion of the panel side frame F1 (see FIGS. 4A and 5A) or a portion of the illuminator side frame F2 (see FIGS. 4B and 5B) which holds the thickest portion of the thick portion DBa.

In other words, the panel side frame F1 and the illuminator side frame F2 are disposed in such a manner that their surfaces opposing to the diffusion plate DB are substantially parallel to each other while keeping a predetermined space therebetween. The portion between the panel side frame F1 and the illuminator side frame F2 into which the thick portion DBa is inserted and held is formed to be a gap narrower than the predetermined space. In this way, the vibration of the thick portion DBa is suppressed. Further, the support member S1 in this embodiment fixes the panel side frame F1 and the illuminator side frame F2 while keeping the space therebetween. Further, the support member S1 has a wall surface formed to be continuous with two opposing surfaces of the panel side frame F1 and the illuminator side frame F2 facing the diffusion plate DB and the optical sheet OS. The diffusion plate DB and the optical sheet OS have their outer peripheral portions covered and held by the two opposing surfaces and the wall surface. The protrusion Pr may be formed in both the panel side frame F1 and the illuminator side frame F2.

Further, although the protrusion Pr is formed of the resin plate in this embodiment, for example, the protrusion Pr may be integrally formed with the panel side frame F1 using the same material as the panel side frame F1, and may be formed of a material other than the resin plate. Further, although the protrusion Pr is formed to have a plate-like shape, the protrusion Pr may be formed to be an inverted T-shaped member projecting from the panel side frame F1, and may have a round shape with no corners allowing for coming into contact with the optical sheet OS. Further, the protrusion Pr may take the form of a cushioning member having elasticity such as a rubber in order to absorb a shock when hit by the optical sheet OS or the diffusion plate DB.

[Embodiment 2]

Figure 6:
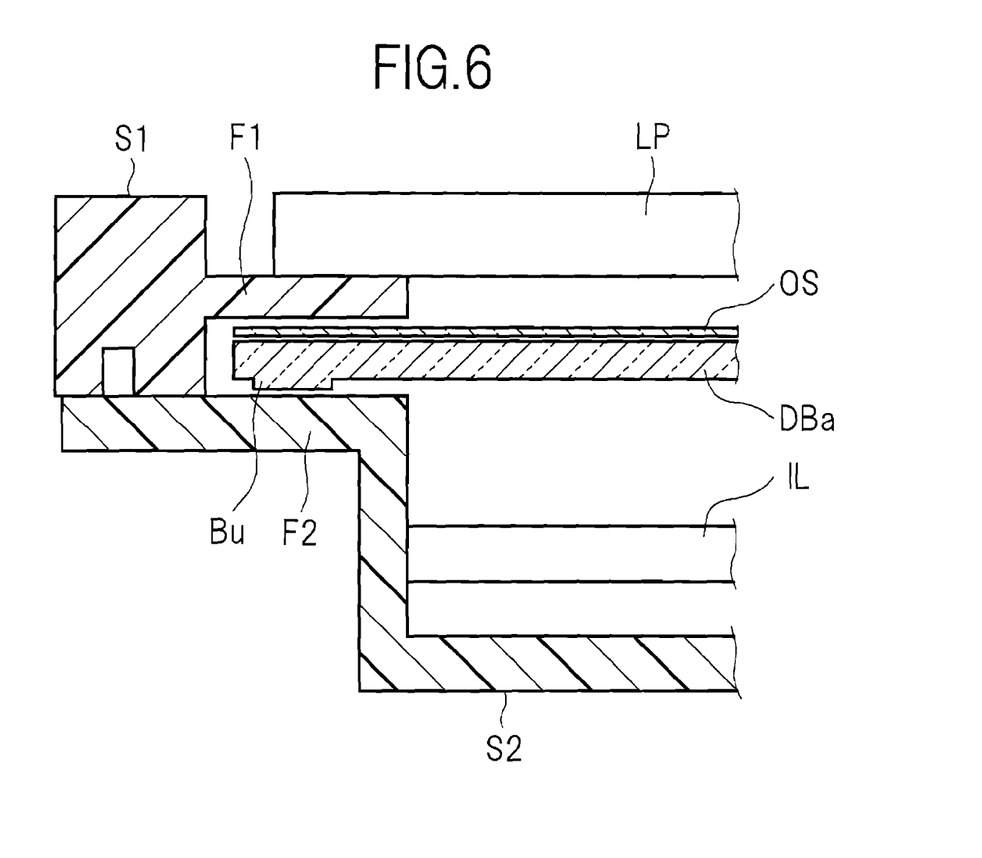
FIG. 6 is a cross-sectional view illustrating a liquid crystal display device according to Embodiment 2.

In Embodiment 1 described above, the protrusion Pr is formed in a portion of the panel side frame F1 which holds the thick portion DBa in order to suppress the vibration of the diffusion plate DB including the thick portion DBa. However, in this embodiment, as illustrated in FIG. 6, the protrusion Pr is not formed, but the diffusion plate DB includes a bank portion Bu instead. Otherwise, the liquid crystal display device in Embodiment 2 is substantially similar to the liquid crystal display device in Embodiment 1, and hence description of similarities is omitted.

The bank portion Bu is disposed in a position sandwiched between the panel side frame F1 and the illuminator side frame F2, the position being on the extension of a portion opposing to the linear illuminator IL. The diffusion plate DB has a larger thickness in the bank portion Bu than in the thick portion DBa below the display region DP. In this way, a clearance in a thickness direction of a portion which holds the thick portion DBa is reduced, and hence the vibration caused by the thick portion DBa is suppressed.

Note that, in Embodiment 2, as illustrated in FIG. 6, the bank portion Bu is formed to project from the bottom surface of the diffusion plate DB. However, the bank portion Bu may be formed so as to project from the top surface. In a case where the bank portion Bu is formed so as to project from the top surface, the optical sheet OS maybe formed to have a cutout for clearing the bank portion Bu. Further, although the bank portion Bu is integrally formed with the diffusion plate DB in Embodiment 2, the bank portion Bu may be formed by attaching another member to the diffusion plate DB.

Note that, although the linear illuminator IL is the cold-cathode fluorescent tube in each of the above-mentioned embodiments, the linear illuminator IL may be configured as other kinds of fluorescence tube, for example, and may be configured to have light emitting diodes arranged in a linear region.

Note that, as with each of the above-mentioned embodiments, it is preferred that one optical sheet OS be disposed over the diffusion plate DB. However, a plurality of optical sheets OS may be disposed and the optical sheet OS may be disposed not over but under the diffusion plate DB. In any case, the disposition of the protrusion Pr, for example, allows the vibration of the diffusion plate DB including the thick portion DBa to be suppressed, and the optical sheet OS is less likely to be damaged as with the case of each of the above-mentioned embodiments. Further, the optical sheet OS may be provided with a cutout for clearing the protrusion Pr and the bank portion Bu.

Note that, in each of the above-mentioned embodiments, one linear illuminator IL is disposed linearly in the horizontal direction as seen by a viewer. However, a plurality of linear illuminators IL maybe disposed linearly in the horizontal direction. Further, one or a plurality of linear illuminators IL may be disposed linearly in the vertical direction. Here, for example, in the case of a large liquid crystal display device, it is preferred that the linear illuminators IL be disposed at a plurality of positions. In any case, the thick portion DBa is formed to be opposing to at least one of one or a plurality of linear illuminators IL, with the result that the liquid crystal panel LP is uniformly illuminated with light.

Note that, in each of the above-mentioned embodiments, the thick portion DBa is formed to bulge downward. However, the thick portion DBa may be formed to bulge upward, and may be formed to bulge both upward and downward so as to increase its thickness. In any case, the light emitted from the linear illuminator IL is efficiently diffused, and the vibration occurs due to the thick portion DBa.

Note that, in each of the above-mentioned embodiments, as illustrated in FIG. 3, etc., a portion other than the thick portion DBa in the bottom surface of the diffusion plate DB is formed to be flat, and the thick portion DBa is formed to gradually bulge. In each of the above-mentioned embodiments, it is preferred that the thick portion DBa have a width (length in the vertical direction of FIG. 2) of 20% or more and 40% or less of the width of the diffusion plate DB. It is preferred that the thickest portion of the thick portion DBa have approximately twice the thickness of a portion other than the thick portion DBa.

Note that, as with each of the above-mentioned embodiments, it is desired that the thick portion DBa extend in the diffusion plate DB from a portion opposing to the linear illuminator IL into a position sandwiched between the panel side frame F1 and the illuminator side frame F2, and the protrusion Pr or the bank portion Bu be disposed in the position of the thick portion DBa extended between the panel side frame F1 and the illuminator side frame F2. However, the thick portion DBa is not necessarily required to extend to the position between the panel side frame F1 and the illuminator side frame F2. In such a case, the light emitted from the linear illuminator IL can also be efficiently diffused. Further, the vibration due to the thick portion DBa is suppressed, for example, by disposing the protrusion Pr as with the above-mentioned embodiments.

Note that, in each of the above-mentioned embodiments, the liquid crystal panel LP is fixed by the panel side frame F1, and the support member S1 is supported by the illuminator side frame F2. However, the liquid crystal panel LP may be fixed by a member different from the panel side frame F1, and the support member S1 may be attached to and supported by a member different from the illuminator side frame F2. Further, the support member S1 includes the panel side frame F1, and further fixes the panel side frame F1 and the illuminator side frame F2 while keeping the space therebetween. However, the member for fixing while keeping the space may not be the support member S1. The support member S1 maybe a member different from the panel side frame F1. Further, the panel side frame F1 and the illuminator side frame F2 may be integrally formed as one common member.

Further, the present invention may be applied to the liquid crystal display device of In Plane Switching (IPS) type, and needless to say, the present invention may also be applied to the liquid crystal display device of other modes such as Vertical Alignment (VA) type and Twisted Nematic (TN) type.

Needless to say, the present invention is not limited to the above-mentioned embodiments but various modifications are possible, and the above-mentioned embodiments maybe combined. Further, for example, the configurations described in the embodiments can be replaced by substantially the same configuration, a configuration providing the same action and effect, or a configuration which can achieve the same object.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a liquid crystal panel including a display region for displaying an image;
   a single linear illuminator disposed below the display region and extending linearly; and
   a diffusion plate disposed between the liquid crystal panel and the linear illuminator, wherein:
   the diffusion plate includes a single thick portion which is formed to be thicker than a flat portion located below the display region;
   the linear illuminator comprises a fluorescent tube;
   the thick portion is formed above the linear illuminator;
   the thick portion is formed to be wider than the linear illuminator;
   the diffusion plate is mixed with microscale spheres such that a light diffusion degree of the diffusion plate becomes larger as a thickness of the diffusion plate becomes larger; and
   the width of the thick portion and the linear illuminator are defined in a direction that is perpendicular to the longer direction of the liquid crystal panel and is perpendicular to the longer direction of the linear illuminator.

2. The liquid crystal display device according to claim 1, further comprising:
   an optical sheet disposed between the liquid crystal panel and the linear illuminator;
   a panel side frame having a frame-like shape and disposed closer to the liquid crystal panel compared to the optical sheet and the diffusion plate; and
   an illuminator side frame having a frame-like shape and disposed closer to the linear illuminator compared to the optical sheet and the diffusion plate, wherein:
   the panel side frame and the illuminator side frame are disposed to have a space therebetween;

the diffusion plate and the optical sheet are inserted into the space between the illuminator side frame and the panel side frame and held therein; and at least one of the panel side frame and the illuminator side frame includes a protrusion in a portion which holds the thick portion of the diffusion plate.

3. The liquid crystal display device according to claim 2, wherein:

the optical sheet is disposed between the liquid crystal panel and the diffusion plate;

the diffusion plate includes a top surface which is formed to be flat; and the thick portion is formed to bulge downward.

4. The liquid crystal display device according to claim 2, wherein the panel side frame includes the protrusion in a portion which holds the thick portion of the diffusion plate.

5. The liquid crystal display device according to claim 1, wherein the thick portion is formed to gradually bulge toward a position above a center of the linear illuminator.

6. The liquid crystal display device according to claim 2, wherein the thick portion extends along the linear illuminator into the space between the illuminator side frame and the panel side frame.

7. The liquid crystal display device according to claim 2, wherein the protrusion is formed by attaching a resin plate to at least one of the panel side frame and the illuminator side frame.

8. The liquid crystal display device according to claim 2, wherein at least one of the panel side frame and the illuminator side frame includes the protrusion in a portion which holds a thickest portion of the thick portion.

9. The liquid crystal display device according to claim 1, further comprising:

an optical sheet disposed between the liquid crystal panel and the linear illuminator;

a panel side frame having a frame-like shape and disposed closer to the liquid crystal panel compared to the optical sheet and the diffusion plate; and an illuminator side frame having a frame-like shape and disposed closer to the linear illuminator compared to the optical sheet and the diffusion plate, wherein:

the panel side frame and the illuminator side frame are disposed to have a space therebetween;

the diffusion plate and the optical sheet are inserted into the space between the illuminator side frame and the panel side frame and held therein;

the diffusion plate includes a a protrusion in a position between the panel side frame and the illuminator side frame, the position being on an extension of a portion above the linear illuminator; and the protrusion has a thickness larger than a thickness of the thick portion.

10. The liquid crystal display device according to claim 1, wherein the thick portion is formed to bulge toward the linear illuminator.

11. The liquid crystal display device according to claim 1, wherein the thick portion has a width of 20% or more of the width of the diffusion plate.

12. The liquid crystal display device according to claim 1, wherein the thick portion is disposed between two flat surfaces, and the thick portion gradually bulges from a boundary between the thick portion and one of the two flat surfaces.

* * * * *